3,317,617
CHLORINATION OF TOLUENE
Eugene P. Di Bella, Rochelle Park, N.J., assignor to Tenneco Chemicals, Inc., a corporation of Delaware
No Drawing. Filed Oct. 21, 1965, Ser. No. 500,365
13 Claims. (Cl. 260—650)

This invention relates to a process for the production of chlorotoluenes. More particularly, it relates to a process for the production of monochlorination products of toluene whereby there is obtained a mixture of monochlorotoluene isomers of unusually high para-chlorotoluene content and unusually low orthochlorotoluene content. It further relates to a process for the production of mixtures of polychlorotoluenes that contain an unusually large amount of isomers having a chlorine atom in the 4-position of the aromatic ring.

In accordance with the present invention, it has been found that when toluene is chlorinated in the presence of platinum dioxide the monochlorotoluene mixture formed has a para-chlorotoluene content that is substantially higher than that obtained using any of the previously-known nuclear chlorination catalysts, such as iron. When the chlorination of toluene is carried beyond the monochlorination stage, mixtures of polychlorotoluenes are formed that contain a major amount of isomers having a chlorine atom in the 4-position of the aromatic ring.

Any of the commercially available forms of platinum dioxide may be used in the practice of this invention. It is generally preferred to use a standard Adams platinum oxide catalyst. This catalyst may be prepared by the methods described by Adams and Shriner, J. Am. Chem. Soc., vol. 45, p. 2171 (1923), by Voorhees and Adams, J. Am. Chem. Soc., vol. 44, p. 1397 (1922), and by Ellis, "Hydrogenation of Organic Substances," third edition (Van Nostrand Co.) (1930). These methods involve fusing chloroplatinic acid with sodium nitrate at about 500° C., followed by washing with water to remove the sodium salts and drying. The resulting finely-divided powder contains about 80–85 percent of platinum and small amounts of combined water and sodium salts.

The amount of platinum dioxide that is used is that which will produce the desired para directive effect. In most cases as little as about 0.25 gram of platinum dioxide per mole of toluene will bring about an increase in the para-isomer content of the monochlorotoluene. There appears to be no advantage in using more than about 5 grams of the catalyst per mole of toluene. In most cases 1 gram to 3 grams of platinum dioxide is used per mole of toluene.

The chlorination of toluene may be carried out by procedures that are well known in the art. For example, chlorine may be added to a reaction mixture containing toluene and the catalyst and the addition of chlorine continued until the increase in the weight of the reaction mixture indicates that the desired amount of chlorine has been reacted with the toluene. In the production of monochlorotoluene, the reaction is usually continued until about 0.8 gram atom to 1.2 gram atoms of chlorine and preferably about 1 gram atom of chlorine has reacted with the toluene. Polychlorotoluenes result when about 2 to 5 gram atoms is reacted per mole of toluene.

The chlorination reaction may be carried out at temperatures in the range of about −5° C. to 60° C., with 10° C. to 30° C. the preferred temperature range. Below about 5° C., the reaction takes place too slowly to be of commercial interest. At temperatures above 60° C., there is a tendency for side-chain chlorinated by-products to form. Since chlorination is an exothermic reaction, external cooling may be required to maintain the reaction temperature in the desired range.

The rate at which the chlorine is added to the reaction mixture does not have an appreciable effect on the yield of chlorotoluene or on the isomer distribution of the product.

To obtain chlorotoluene mixtures having the improved isomer distribution that results from the practice of this invention, it is necessary that the chlorination be carried out in the absence of iron. This can be accomplished by using equipment that is glass-lined or that has been fabricated from materials that do not contain iron. In addition light should be excluded from the reaction vessel to minimize the formation of side-chain chlorinated products.

When toluene is chlorinated in the presence of platinum dioxide, the reaction mixture contains in addition to unreacted toluene and chlorotoluenes small amounts of compounds resulting from the addition chlorination of toluene. These compounds can be dehydrochlorinated to the corresponding chlorotoluenes by heating the reaction mixture to its reflux temperature (about 155° C.).

When the chlorination of toluene has been completed, the platinum dioxide catalyst may be separated from the reaction mixture by filtration or other suitable procedure. The platinum dioxide may if desired be reused in a succeeding chlorination reaction.

The reaction product obtained by monochlorinating toluene in the presence of platinum dioxide generally contains a major amount of monochlorotoluene and smaller amounts of toluene and dichlorotoluene. The monochlorotoluene fraction, which may be separted from the toluene and dichlorotoluene by fractional distillation or other known techniques, generally contains at least 40 percent and preferably at least 45 percent of parachlorotoluene, the remainder being ortho-chlorotoluene. Metachlorotoluene is either not formed or formed in only trace amounts. The ortho- and para-chlorotoluenes may be separated by fractional distillation.

When the chlorination of toluene in accordance with this invention is carried beyond the monochlorotoluene stage, polychlorotoluene mixtures are obtained that contain a major amount of compounds that have a chlorine atom in the 4-position of the aromatic ring, with the amount of such isomers directly dependent upon the para-chlorotoluene content of the monochlorotoluene mixture. To obtain a maxium yield of these polychlorotoluene isomers, the monochlorotoluene mixture may be distilled to yield a fraction containing a major amount of para-chlorotoluene, which may then be further chlorinated in the presence of one of the aforementioned catalysts.

The invention is further illustrated by the examples that follow. In these examples all percentages are percentages by weight unless otherwise specified.

EXAMPLE 1

A mixture of 368 grams (4.0 moles) of toluene and 4.7 grams of platinum dioxide was chlorinated in the absence of light by passing a stream of gaseous chlorine over its surface at the rate of about 75 grams per hour until a weight increase of 168 grams (ca. 1.2 gram atoms of chlorine per mole of toluene) had been attained. During the chlorination the reaction mixture was stirred, and external cooling was used to maintain the temperature in the range of 15°–20° C. The reaction mixture was filtered to remove the catalyst.

The reaction mixture, which contained unreacted toluene, chlorotoluenes, and compounds resulting from the addition chlorination of toluene, was heated to its reflux temperature (155° C.) to effect dehydrochlorination of the addition chlorination compounds to chlorotoluenes.

Vapor phase chromatographic analysis indicated that the resulting product contained 3.3% of toluene, 44.5% of o-chlorotoluene, 50.2% of p-chlorotoluene, and 2.0% of dichlorotoluene. This mixture was distilled to yield a monochlorotoluene fraction that contained 53.0% of para-chlorotoluene.

EXAMPLE 2

A series of chlorinations of toluene was carried out by the procedure described in Example 1 using various platinum dioxide catalysts. The results obtained are summarized in the table that follows:

|  | Example No. | | | |
|---|---|---|---|---|
|  | 2A | 2B | 2C | 2D |
|  | Catalyst | | | |
|  | Standard Adams Catalyst | $PtO_2 \cdot (H_2O)_n$ | $PtO_2$ (Brown) | $PtO_2$ (Black) |
| Amount of chlorine added (g.a. per mole of toluene) | 0.99 | 1.01 | 1.01 | 1.01 |
| Composition of reaction product (percent): | | | | |
| Toluene | 26.2 | 43.0 | 2.3 | 13.7 |
| Monochlorotoluene | 72.0 | 53.9 | 94.8 | 81.0 |
| Benzyl Chloride | 1.8 | 2.3 | 0.6 | 2.5 |
| Dichlorotoluene |  | 0.8 | 2.5 | 2.8 |
| Percent p-Chlorotoluene in Monochlorotoluene | 58.2 | 54.0 | 46.8 | 42.4 |

EXAMPLE 3

A series of chlorinations was carried out in which toluene was chlorinated to various levels in the presence of platinum dioxide which had been dried in vacuum at 55°–60° C. for 2 hours. The chlorination was carried out at 15°–20° C. The reaction product was filtered to remove the catalyst and then heated at its reflux temperature for one hour. The results obtained are summarized in the table that follows:

| Ex. No. | Amount of Chlorine added (g.a. per mole of toluene) | Yield of Monochlorotoluene | Percent p-Chlorotoluene in Monochlorotoluene | Percent Benzyl Chloride |
|---|---|---|---|---|
| 3A | 0.99 | 94.7 | 53.0 |  |
| 3B | 1.05 | 94.6 | 53.6 |  |
| 3C | 1.08 | 90.5 | 54.2 | 1.6 |
| 3D | 1.11 | 86.3 | 55.3 | 2.2 |
| 3E | 1.20 | 75.8 | 59.7 | 5.1 |

COMPARATIVE EXAMPLE

Toluene was chlorinated by the procedure described in Example 1 using iron powder as the chlorination catalyst. The monochlorotoluene fraction obtained contained 37.1 percent of para-chlorotoluene.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a process for the production of para-chlorotoluene by the chlorination of toluene, the improvement which comprises carrying out the chlorination in the presence of platinum dioxide, said platinum dioxide being present in the amount of about 0.25 gram to 5 grams per mole of toluene.

2. A process for the production of monochlorotoluene containing at least 40 percent of para-chlorotoluene which comprises contacting toluene with chlorine in the amount of about 0.8 gram atom to 1.2 gram atoms of chlorine per mole of toluene at a temperature in the range of about −5° C. to 60° C. and in the presence of platinum dioxide, said platinum dioxide being present in the amount of about 0.25 gram to 5 grams per mole of toluene.

3. The process of claim 2 wherein about 1 gram atom of chlorine is reacted per mole of toluene.

4. The process of claim 2 wherein the chlorination is carried out at a temperature in the range of 10° C. to 30° C.

5. The process for the production of monochlorotoluene containing at least 40 percent of para-chlorotoluene which comprises contacting toluene with chlorine in the amount of about 0.8 gram atom to 1.2 gram atoms of chlorine per mole of toluene at a temperature in the range of about −5° C. to 60° C. and in the presence of platinum dioxide, said platinum dioxide being present in the amount of about 0.25 gram to 5 grams per mole of toluene, thereby forming a reaction product comprising chlorotoluenes and addition chlorination products of toluene, and heating said mixture to its reflux temperature to dehydrochlorinate said addition products to chlorotoluenes, thereby forming a mixture of monochlorotoluenes containing at least 40 percent of parachlorotoluene.

6. A process for the production of para-chlorotoluene which comprises the steps of contacting toluene with chlorine in the amount of about 0.8 gram atom to 1.2 gram atoms of chlorine per mole of toluene at a temperature in the range of about −5° C. to 60° C. and in the presence of platinum dioxide, said platinum dioxide being present in the amount of about 0.25 gram to 5 grams per mole of toluene, thereby forming a reaction product comprising chlorotoluenes and addition chlorination products of toluene, heating said reaction product to its reflux temperature to dehydrochlorinate said addition products to chlorotoluenes, thereby forming a mixture of chlorotoluenes containing at least 40 percent of para-chlorotoluene, and separating para-chlorotoluene by fractional distillation from said mixture of chlorotoluenes.

7. The process of claim 6 wherein about 1 gram atom of chlorine is reacted per mole of toluene.

8. The process of claim 6 wherein the chlorination is carried out at a temperature in the range of 10° C. to 30° C.

9. The process of claim 6 wherein 1 gram to 3 grams of platinum dioxide is used per mole of toluene.

10. A process for the production of polychlorotoluenes having from 2 to 5 chlorine atoms and containing a major amount of polychlorotoluene isomers having a chlorine atom in the 4-position of the aromatic ring which comprises contacting toluene with chlorine in the amount of about 2 to 5 gram atoms of chlorine per mole of toluene at a temperature in the range of about −5° C. to 60° C. and in the presence of platinum dioxide, said platinum dioxide being present in the amount of about 0.25 gram to 5 grams per mole of toluene.

11. The process of claim 2 wherein 1 gram to 3 grams of platinum dioxide is used per mole of toluene.

12. The process of claim 10 wherein the chlorination is carried out at a temperature in the range of 10° C. to 30° C.

13. The process of claim 10 wherein 1 gram to 3 grams of platinum dioxide is used per mole of toluene.

References Cited by the Examiner

UNITED STATES PATENTS 2,950,329   8/1960   Reicheneder _____ 260—650

LEON ZITVER, *Primary Examiner.*

N. J. KING, Jr., *Assistant Examiner.*